July 6, 1937.  J. H. L. DE BATS  2,086,121

PROCESS OF MAKING EDGED TOOLS

Filed Nov. 9, 1934  3 Sheets-Sheet 1

INVENTOR
Jean Hubert Louis De Bats
BY
Austin + Dix
ATTORNEYS

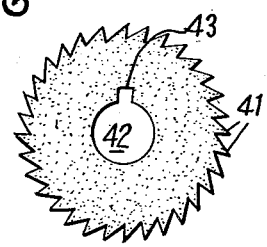
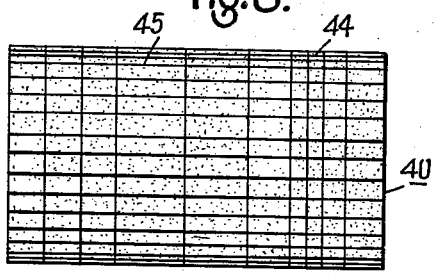
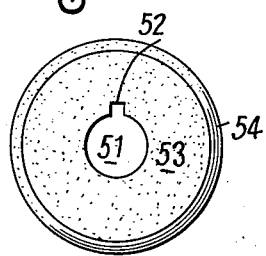
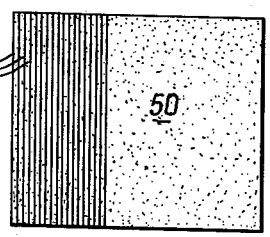
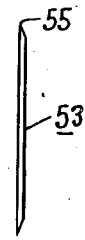
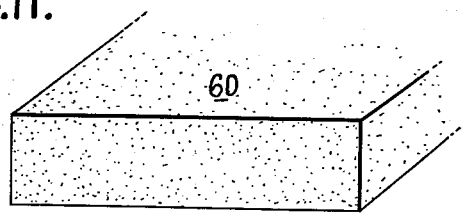
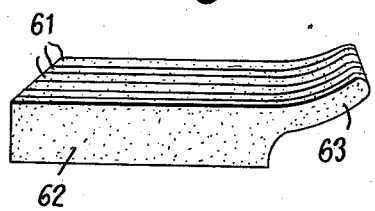
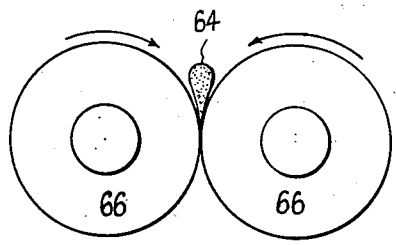
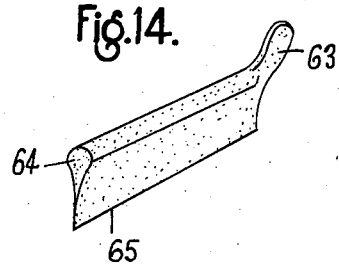

July 6, 1937.  J. H. L. DE BATS  2,086,121
PROCESS OF MAKING EDGED TOOLS
Filed Nov. 9, 1934    3 Sheets-Sheet 3

INVENTOR
Jean Hubert Louis De Bats
BY
Austin + Dix
ATTORNEYS

Patented July 6, 1937

2,086,121

UNITED STATES PATENT OFFICE 2,086,121

PROCESS OF MAKING EDGED TOOLS

Jean Hubert Louis De Bats, East Orange, N. J., assignor of ten per cent to Howard W. Dix, Scarsdale, N. Y., and of ninety per cent to Metal Carbides Corporation, Youngstown, Ohio, a corporation of New Jersey Application November 9, 1934, Serial No. 752,332

4 Claims. (Cl. 76—104)

This invention relates to a process of preparing edged tools from high melting, hard materials such as tungsten carbide, molybdenum carbide, tantalum carbide, titanium carbide, boron carbide and other hard, high melting compounds of metals of the V and VI periodic groups, and/or mixtures of the same.

Hitherto, in the preparation of edged cutting tools various steels have been preferred, due to their workability and their capacity to receive forging treatments. In the field of the refractory carbides, the naturally high mineralogical hardness has militated against the use of these otherwise suitable materials because of the difficulty of forming the same and the inherent brittleness of the material.

In my prior patents, No. 1,951,133, Compositions of matter and process of preparing same, issued March 13, 1934, patent application Serial No. 597,083, Improved wear-resisting products and cutting tools, and the like, filed January 16, 1932, and Patent No. 1,950,355, Improved cutting and forming tools and wearing surfaces, issued March 6, 1934, there have been disclosed methods of preparing tools and wear and abrasion resistant members of tungsten carbide, both 100% tungsten carbide content as well as tungsten carbide base compositions, including appreciable amounts of auxiliary metals such as cobalt, nickel and iron to make the composites workable under pressure. In my co-pending application Ser. No. 580,727, Refractory metal compounds and process of making same, filed December 12, 1931, there is disclosed a process of preparing refractory metal compounds for machine tools and machine elements in which refractory base materials are desirably heated, without pressure, to a point at which the mass expands or swells up internally and in which process the so expanded, but yet solid, unitary mass is subjected to a forming treatment of the order of forging or compressing, or the heated, but not yet expanded metal, is also formed in the same manner.

A feature of the present invention, is the pressureless treatment of refractory materials such as the carbides of the metals of the V and VI periodic groups, as indicated above, to secure edged members in a simple and efficient manner.

A further feature of novelty of the present invention resides in the treatment of non-compacted powdered refractory materials to form chalk-like solid masses which may be worked to give blanks of a desired general configuration suitable for cutting members of various kinds, and the subsequent treatment of such so-formed blanks, at high heats, to compact and/or densify same by the sole action of applied heat.

It is also a separate feature of this invention to provide an improved process for preparing edged tools and formed articles of various kinds by incorporating refractory materials in a workable sheathing and thereafter consolidating and forming the composite to a desired finished shape.

Other features of novelty and advantage of the present invention include improved operating steps and heat treatments as well as apparatus features permitting speedy and accurate working and carrying out of the improvements of the present invention.

Considering the several features of the present invention generally, one form of operative procedure involves the taking of a powdered mass of a refractory carbide such as any of molybdenum carbide, tungsten carbide, boron carbide, tantalum carbide, titanium carbide, beryllium carbide or mixtures of the same, or others, as well as admixtures thereof with auxiliary metals such as any of cobalt, nickel or iron, or carbon-free refractory alloys such as tungsten alloyed with cobalt, and in percentages ranging from a fraction of a per cent. up to 50% of the amount of the complete material, and placing same in suitable containers and in a non-compacted condition. The containers with their contained refractory material are heat treated in suitable furnaces at temperatures of the order of 1000° C. to 1500° C., depending upon the composition and bulk of the materials and for time periods of the order of ten minutes to one hour depending upon the bulk or mass of the material treated. The higher the content of the refractory component, the longer will be the duration of the heat treatment and the higher the temperature of the treatment.

After the completion of such heat treatment it will be found that the material has shrunken or agglomerated to a solid body of generally chalk-like consistency, that is, the material while possessing sufficient strength to permit its being handled as a unit or body is distinctly friable and may be readily worked and formed by simple shaping methods. While in this condition the blocks may be formed to such shapes that when the formed block is cut or sliced in a plurality of sections the resulting blanks approximate various edge cutting members in configuration. Thus a generally rectangular block may be suitably grooved on the sides and provided with central longitudinal apertures so that when such a block is sliced the resulting blanks will have the general form of safety razor blades. Or again, a cylindrical block may be formed and fluted on its surface or otherwise shaped to give saw teeth or milling cutter edges or the like. Such a cylindrical block may be centrally perforated and provided with a key slot, after which blanks are sawed off in any suitable thickness, depending upon the type of article being made. As indicated above, the chalky mass 21 may be cut or rough formed to a desired shape. Ordinary copper disks or like cutting wheels, fed with suitable lapping or cutting materials, such as diamond dust, may be used for slicing or separating blanks. A carbide mass may be treated in this manner because its bulk affords support to the blanks as formed during the cutting operation. Surface forms may be imparted to the friable carbide mass by suitable forming tools.

The blanks formed according to the procedure above outlined may now be packed in suitable containers in loose powdered refractory embedments of non-reactive materials such as any of graphite, periclase (MgO) and the like. Where large sized blanks are being treated they may be packed in the embedment in any suitable manner. Where relatively thin blanks, such as safety razor blade members, are being treated, they are laid on top of each other with a thin pounce or layer of embedment between the same. When the container has been suitably filled it is covered and placed in a furnace which may be slowly and uniformly heated to temperatures of the order of 2,000° to 2,500° C., and for periods of from ten minutes to an hour depending upon the size of the blanks being treated. Pure carbide materials may have to be treated at temperatures up to the order of 2,500° C. while blanks made of compositions containing auxiliary, lower melting metals, will preferably require lesser heat treatment down to 2,000° C. In any case, the amount of heat is such as to cause the maximum shrinkage of the blank but not the expansion of the material of the same.

After the desired heat treatment has been accomplished the container and contents are allowed to cool slowly. This slow cooling period may vary from an hour to twenty-four hours or more, again depending upon the size and bulk of the articles treated. This slow cooling permits the relief of any strains which may have been set up in the heating of the materials, although the treatment is preferably so carried out as to preclude the formation of any strains. When the cooling has been completed and the articles have attained room temperature they are removed from the container and treated further.

The blanks, removed from the container and its embedment, are cleaned and then polished either before or after forming the desired cutting edges thereon. In all the work on refractory materials forming the basis of the present invention the polishing and edge forming operations are preferably done by diamond grinding and lapping. For some purposes, where the materials are sufficiently soft, that is where an appreciable amount of auxiliary metal is present, materials like boron carbide and other refractory carbides and silicides, such as carborundum, Aloxite or alumina may be used with success for certain of these operations.

It will thus be seen that molybdenum carbide, tungsten carbide, boron carbide, tantalum carbide, titanium carbide, beryllium carbide and other carbides alone, and in admixture with auxiliary metals such as cobalt, nickel, iron, tungsten-cobalt, and others, may be readily and simply formed into articles having cutting edges without requiring excessive number of treatments of various kinds, and more particularly without requiring the use of enormous forming pressures, either before or after heat treatments.

Another method of forming articles having cutting edges, the said articles including refractory, normally non-workable materials such as molybdenum carbides, tungsten carbide and the like, as the material of the cutting edge, will now be described.

In this form of the invention a powdered refractory material such as molybdenum carbide, tungsten carbide, tantalum carbide, titanium carbide, beryllium carbide, boron carbide and other refractory carbides, silicides, tellurides of refractory metals of the V and VI periodic groups with or without auxiliary, lower melting metals associated therewith and in powdered form, are tamped or packed into tubular metallic sheaths. These sheaths are sealed at both ends and subjected to sufficient heat, usually below the melting point of the sheath material, and for a sufficient length of time to permit the composite article to attain a uniform temperature throughout. In this condition the composite article is subjected to a forging or forming operation which densifies and consolidates the same and welds the sheath material to the refractory core material, imparting the desired shape. The sheath may be made of stainless steel or other materials.

For certain purposes such as the formation of straight edge razors the resulting forged or formed blank may be provided with a back of stainless steel or the like, preferably of the same metal as the sheath itself. This backing member may be generally U-shaped to fit over one edge of the blank, and if a straight edge razor is to be formed it may be extended sufficiently beyond the blank to form the tang or holder of the finished product. The two members are united as by welding or brazing and the composite article so formed may be rolled or swaged to approximate or give an article having the cross sectional outline of a razor or cutting tool being formed. After the desired rough form has been imparted to the article it may be hollow ground in the usual manner to properly shape the same. In the grinding operation the sheath metal is stripped from the cutting edge and the carbide or refractory component exposed. This cutting edge can then be formed by diamond grinding and finished on a diamond lap. The resulting article will have a thin refractory carbide or other materials as a central layer embedded in and supported on all sides by a relatively softer, tougher supporting material. The cutting edge will be the only part of the refractory material which is exposed. As the supporting metal extends substantially down to the cutting edge the natural frangibility of the cutting edge material will not be a disadvantage because of the firm support of the associated tougher metal parts. It will be understood that various degrees of toughness may be obtained by employing different mixtures of the carbides and/or the auxiliary metals.

The foregoing processes may also be applied to the manufacture of safety razor blades, in which case the forged or formed blanks containing a central core of refractory material may be split or otherwise shaped to fit standard safety razor holders such as the Gillette type, a single or a double half blade being used and being provided with the necessary notches to engage the holder. The free or cutting edge of such safety razor blades may be treated as by grinding to remove enough of the sheath metal to expose the refractory cutting material and the latter may be formed to a finished cutting edge by the usual diamond grinding and lapping operations.

Referring now more particularly to the drawings:

Fig. 7 is an end elevation and Fig. 8 is a front elevation of the block shown in Fig. 6 after forming saw and milling cutter blanks;

Figs. 9, 10 and 10a are end elevations and an end section of rotary cutting knives showing the method of sawing or slicing off from the block and the finished structure with beveled cutting edge;

Fig. 11 is an elevation of an initially heat compacted but uncompressed refractory block;

Fig. 12 shows the block of Fig. 11 rough shaped to give straight edge razor blanks;

Fig. 13 shows a method of finish grinding and polishing the cutting edges of the blades prepared from the blanks of Fig. 12;

Fig. 14 shows a finished straight edge razor blade;

Figure 1:
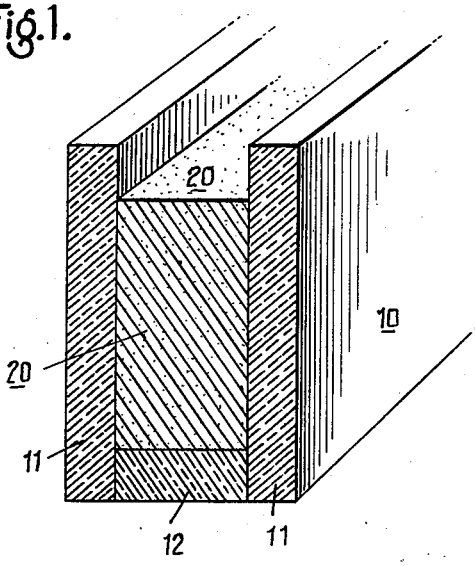
Fig. 1 shows a vertical section partly in elevation of a furnacing mould with uncompressed material therein.
Figure 2:
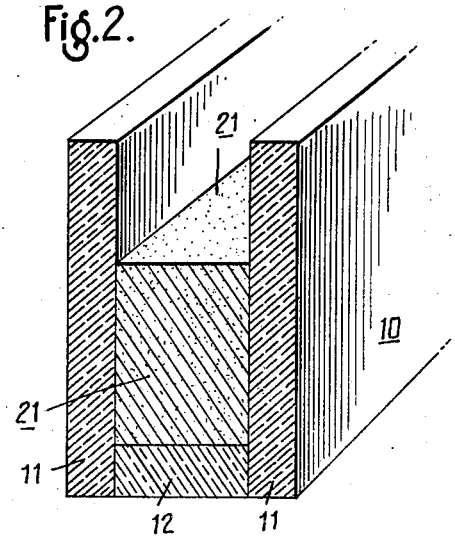
Fig. 2 is a view similar to Fig. 1, showing the material after the initial heating.
Figure 3:
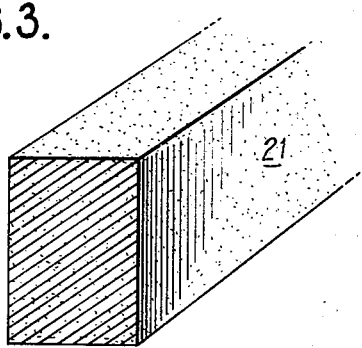
Fig. 3 is an elevation of a slug or block of material as formed in the apparatus of Figs. 1 and 2.

Referring more specifically to the drawings, one mode of operation of the present invention is shown in Figs. 1 to 14, 24, 25 and comprehends the treatment of an uncompressed powdered refractory mass 20 of any suitable refractory carbide material such as pure molybdenum carbide, pure tungsten carbide, pure tantalum carbide, pure boron carbide, pure titanium carbide, etc., as well as any of their mixtures, and also compounds or alloys with auxiliary metals of the type or group comprising cobalt, iron, nickel, steel, carbon-free molybdenum, cobalt, molybdenum-nickel, and/or tungsten-cobalt alloys, alone or in combination with other refractory metals of the V and VI periodic groups. Where auxiliary metals are used the amounts thereof may vary from 1% more or less up to 50 to 60% of the total mass of the original mixture.

The uncompressed refractory material 20 may be placed in a container 10 of any suitable refractory material such as periclase, nichrome, zirconia, having side walls 11, and bottom 12. The container 10 may be placed in a suitable furnace, not shown, and heated to a temperature of the order of 1000° to 1500° C. for a period of ten minutes to one hour depending upon the bulk or mass of the material 20 being treated and the composition thereof, until a uniformly shrunken and coherent mass 21 is formed therein. The mass is allowed to cool in the furnace until the material is thoroughly cool. This cooling operation may take from one to twenty-four hours or more depending upon the bulk and size of the block 21.

Figure 4:
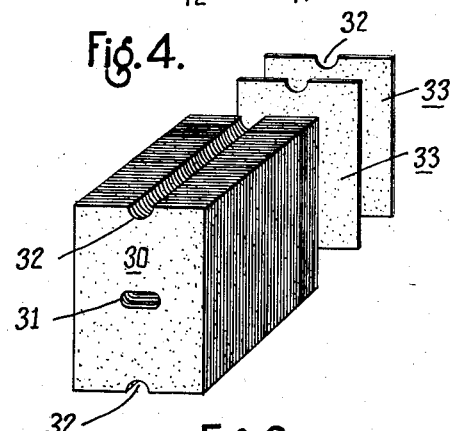
Fig. 4 is an elevation of the block of Fig. 3 shaped and sliced to form separate razor blade blanks.
Figure 5:
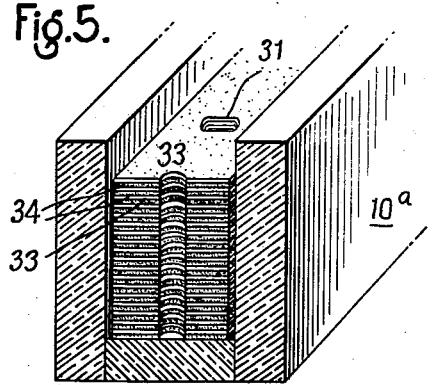
Fig. 5 is an end elevation of a treating box or container with razor blade blanks and associated insulating embedment therein.

The consolidated mass 21 of the originally pulverant refractory material is of a friable, cretaceous, or chalky consistency and may be readily shaped. Such a block may be shaped, as indicated in Fig. 4, to give a slug or block 30 simulating in outline or cross-section a safety razor blade blank of the type having a central longitudinal guiding slot 31 with edge guiding and locking slots 32. The so formed block may then be sawed or cut to give razor blade blanks 33 of any desired thickness. These blanks may then be placed in a treating box or container 10a and piled one on top of another, an embedment or powder 34 of suitable refractory material being sprinkled over each blank to separate and insulate it from other blanks. The container is also filled with this embedding material so that the blade blanks are completely covered. Powdered graphite, carbon, zirconia, magnesia, including periclase, and other non-reactive insulating refractory materials may be used for the embedding and insulating material 34.

The container 10a may be then furnaced in any suitable furnace, such as an induction furnace or the like, at temperatures of 1800° to 2500° C. and for time periods of from ten minutes to one hour depending upon the size of the articles and the composition thereof. After the container and contents have been brought to uniform heat and held at such heat for a determined period of time the container and contents are allowed to cool for a period varying from one hour to twenty-four hours or more, again depending upon the mass of the articles treated and their composition.

When the blanks 33 are removed from the completely cooled box and embedment they are found to be homogeneous, and dense and exhibit a fine fracture when broken. They are no longer friable and may be ground as by means of diamond grinding and lapping wheels to give finished cutting edges. The blade blanks are polished and ground as indicated, and edged, after which they are ready for use.

Figure 6:
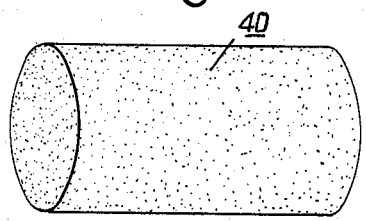
Fig. 6 is a view similar to Fig. 3 showing an elevation of a cylindrical solid block of uncompressed refractory material.

The blank 40 shown in Fig. 6 is prepared in the same manner as the slug or block 21 previously described and this member may be shaped as indicated in Figs. 7 and 8 to give a block having peripheral cutting teeth 41 of any desired configuration. In addition a central aperture 42 and keyway 43 may be formed in the block after which blanks 44, 45, may be sawed off from the block to be further treated in the manner above described to form finished circular saws and milling cutters. Reamers and other rotary cutting members may be prepared in like manner.

Referring now to Figs. 9, 10 and 11, a cylindrical block 50 of initially consolidated but friable refractory carbides and like materials may be first provided with a central aperture 51 together with keyway 52, after which separate blanks 53 are sliced or sawed off from the block. The block 50 is generally of small diameter to give circular cutting knives 53 for use in cloth cutting, leather skiving and slicing machines. The blanks 53 may be rough beveled on one or both sides as indicated generally at 54 and thereafter treated in bulk with like members to densify and consolidate the structure of the individual members. After finish polishing and grinding a finished cutting edge 55 is formed which renders the knife ready for use.

In Fig. 11 a block 60 of friable, heat-treated refractory materials is shown as a generally rectangular sectioned solid of slab-like shape. This solid block is sawed or cut to form a plurality of straight edge razor blade or knife blade blanks 61. As shown these blades may comprise a body portion 62 with an integral tang or handle portion 63. A plurality of the blanks 61 may be initially ground to form rough cutting edges, after which the blocks are embedded in the usual refractory embedment in a container and furnaced in the usual manner to densify and consolidate the materials of the blanks. The so-formed and densified blanks may then be cleaned and polished to give a razor 64 having a cutting edge 65 formed by the action of grinding wheels 66. The grinding wheels 66 may be loaded or surfaced with diamond dust of suitable particle size to permit the initial grinding to finished shape and other series of such wheels may have finer diamonds in the form of dust and surfacing to permit the finished lapping of the cutting edge.

Not only may razor blades and circular cutting knives, circular cutting saws and milling cutters and safety razor blades be formed according to the processes herein, but cutlery generally including surgical knives of various shapes may be readily formed from the initially friable mass of heat treated but uncompressed refractory materials and later subjected to the consolidating treatment in a refractory embedment.

Figure 15:
Fig. 15 is a vertical cross section of a refractory powder as enclosed in and sheathed in a tubular member as shown in Fig. 16.
Figure 16:
Fig. 16 is a compacted or forged blank with the refractory core reacted with the sheath.
Figure 17:
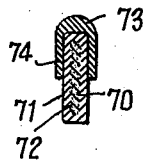
Fig. 17 is a vertical section through a blank for a cutting member as provided with a back.
Figure 18:
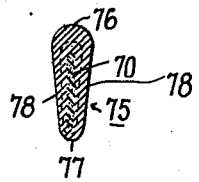
Fig. 18 is a view similar to Fig. 17 showing the composite structure of the latter after heating and rolling or forging to rough blade shape.
Figure 21:
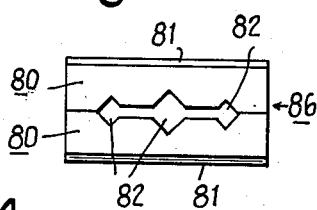
Fig. 21 is an elevation of a two-part safety razor blade of the Gillette type made and formed from the members of Figs. 15 and 16.
Figure 22:
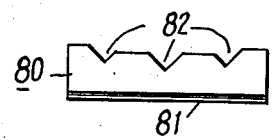
Fig. 22 is a view similar to Fig. 21 of a single blade segment for Gillette type razors.

Referring now to Figs. 15, 16, there is shown a refractory core member of material 70 encased in a flattened metal tubular sheath 71. The material 70 may comprise any of the refractory carbides, silicides, borides, tellurides, of the V and VI periodic groups as hereinabove set forth. The sheath member 71 may be of any ferruginous composition such as stainless steel, or of Monel metal, pure nickel or other workable materials, which metals may be adapted to react and alloy with the refractory core material 70 under the conjoint influence of heat and pressure. The composite material 70, 71, is heated to a forging heat and below the melting temperature of the sheath material proper and is then subjected to a rolling or forging operation to give a blank, designated generally, for the purpose of convenience, by the numeral 72. The member 72 may be of any desired thickness and preferably is made thin enough to serve directly as a razor blade as shown more in detail in Figs. 21 and 22, or it may be used to form straight edge razors, surgeons' knives and other articles of cutlery and cutting members by incorporating it as an element in a cutting member. For this purpose a backing strip or member 73 of generally U-shape may be fitted over one edge and welded or brazed to the outer surface of member 72 as indicated more particularly at 74. The resulting composite may then be heat treated to a forging temperature and a blank 75 of suitable shape formed. This member may have a thickened back portion 76 and a reduced cutting edge blank portion 77 with tapering sides 78. The sheath members are interfused to form a common sheathing about the unreacted portion of the original core material 70.

Figure 19:
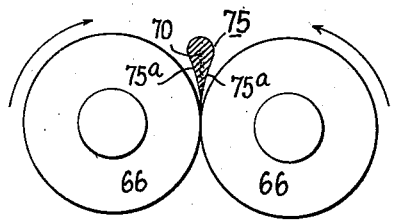
Fig. 19 shows a method of removing sheath metal from adjacent the cutting edge and exposing refractory cutting material for the cutting edge.
Figure 20:
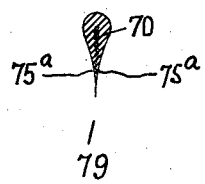
Fig. 20 is a cross section of a finished blade having a refractory core and cutting edge with a softer metal sheathing.

The sides 78 of the composite blade blank may be hollow ground or shaped in any desired manner and sufficient material may be removed from the edge by grinding to expose a cutting edge 79, all as indicated more particularly in Figs. 19 and 20. The edge may be finished in the usual manner as above indicated to give a finished blade designated generally by the numeral 75a.

As noted above the member 72 may be formed to give razor blade segments 80 having an edged portion 81 of pure carbide or carbide base material shaped to formed a desired cutting edge. The edge opposite the cutting edge may be provided with a plurality of indentations 82 adapted to permit the blade to be engaged or abutted against posts 83 of a Gillette or like type safety razor holder 84 and be retained in position by a holder or guard member 85. A pair of the blade segments 80 may be abutted in a holder as indicated generally in Fig. 21, giving a double edge member 86. These segments or members when clamped in a holder will function in the same manner as the usual bendable razor blade and will give substantially permanent cutting edges owing to the high natural mineralogical hardness of the cutting edge material of refractory carbides or mixtures or alloys thereof.

Figure 24:
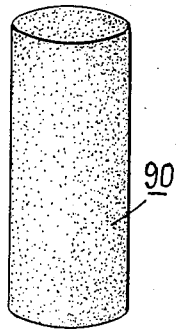
Figs. 24 and 25 are elevations of initially heat treated block and a roll form prepared therefrom.
Figure 23:
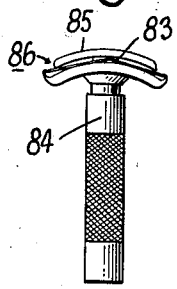
Fig. 23 is a vertical elevation of a Gillette type safety razor with blade segments of Fig. 21 inserted therein.
Figure 25:
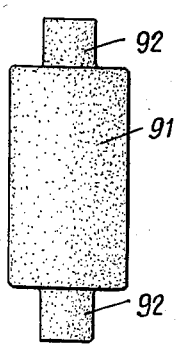

Considering the construction shown in Figs. 24 and 25, a blank or cylindrical block 90 of heat treated refractory carbides and the like, may be formed in the usual manner, and without pressure, and thereafter subjected to forming treatments whereby to form rolls for rolling mills and the like. Such rolls may comprise a body portion 91 with necks or bearing members 92. The member 91, depending on its size, will be subjected to the usual second high temperature heat treatment in an insulating embedment and for relatively long period of time, as indicated hereinbefore. Owing to the bulk or mass of such articles the cooling treatment will be extended over several hours' time, requiring, in some instances, in the case of large members as much as 24 hours, or more. After the cooling treatment the roll may be finished and surfaced in the usual manner by diamond lapping or like treatment. Drill tips, turbines, pump blades and other convoluted articles which are required to be abrasion and wear resistant as well as having a decided shock resistance, may be prepared according to the methods hereinabove set forth.

It will now be appreciated that there has been provided improved edged cutting members of refractory carbides and like compounds, either pure or admixed or alloyed or combined with auxiliary metals of lower melting point to increase the toughness of the materials where desired. It will further be appreciated that the various cutting members such as straight edge razors, safety razor blades, circular saws, milling cutters, shear blades, drills and the like may be prepared from refractory materials as herein set forth solely by heat treatment from an original powdered condition and without applying mechanical pressure at any stage of the preparing or forming operations.

It is to be understood that this invention is not to be limited by any theory of operation expressed or by any example given, and that it include modifications and variations falling within the appended claims.

While certain novel features of the invention have been shown and described and are pointed out in the annexed claims, it will be understood that various omissions, substitutions and changes in the forms and details of the devices illustrated and in their operation may be made by those skilled in the art or without departing from the spirit of the invention.

I claim:

1. In the formation of refractory carbides and other normally non-workable compounds into implements and tools, the improvements comprising placing uncompressed pulverized refractory carbide material in a suitable container, heating the same to form a friable chalk-like mass, thereafter rough-forming said mass into blanks for implements and tools, embedding said blanks in refractory insulating material, heating the so formed and embedded blanks at temperatures sufficient to cause maximum shrinkage of the material of said blanks with resultant densification thereof, cooling the so treated blanks and embedment in situ, removing the cooled blanks from the embedment and finish forming cutting edges on the same by means of diamond bearing and like forming tools.

2. In the formation of refractory carbides and other normally non-workable compounds into implements and tools, the improvements comprising placing uncompressed pulverized refractory carbide and like materials in a suitable container, heating the same to the order of 1000 to 1500° C. and for a time period of ten minutes to one hour to form a friable, chalk-like mass, thereafter rough-forming said mass into blanks for implements and tools, embedding said blanks in refractory insulating material, heating the so formed and embedded blanks at temperatures sufficient to cause maximum shrinkage of the material of said blanks and of the order of 1800° to 2500° C., with a resultant densification thereof, cooling the so-treated blanks and embedment in situ, removing the cooled blanks from the embedment and finish forming the same by means of diamond bearing and like forming tools.

3. In the formation of refractory carbides and other normally non-workable compounds into edged cutting implements and tools, the improvements comprising placing uncompressed pulverized refractory carbide and like materials in a suitable container, heating the same to form a friable, chalk-like mass, heating the same to the order of 1000 to 1500° C. and for a time period of ten minutes to one hour to form a friable, chalk-like mass, thereafter rough-forming said mass into blanks for cutting edged implements and tools, embedding said blanks in refractory insulating material in a container, heating the so formed and embedded blanks at temperatures sufficient to cause maximum shrinkage of the material of said blanks and of the order of 1800° to 2500° C. and for a time period of ten minutes to one hour, with a resultant densification thereof, cooling the so treated blanks and embedment in situ, removing the cooled blanks from the embedment and forming cutting edges on the same.

4. In the formation of refractory carbides and other normally non-workable compounds into edged cutting implements and tools, the improvements comprising placing uncompressed pulverized refractory carbide and like materials in a suitable container, heating the same to form a friable, chalk-like mass, heating the same to the order of 1000 to 1500° C. and for a time period of ten minutes to one hour to form a friable, chalk-like mass, thereafter rough-forming said mass into blanks for cutting edged implements and tools, embedding said blanks in refractory insulating material in a container, heating the so formed and embedded blanks at temperatures sufficient to cause maximum shrinkage of the material of said blanks and of the order of 1800 to 2500° C. and for a time period of ten minutes to one hour, with a resultant densification thereof, cooling the so treated blanks and embedment in situ and for a time period of one hour to twenty-four hours, removing the cooled blanks from the embedment and forming cutting edges on the same.

JEAN HUBERT LOUIS DE BATS.